Dec. 15, 1936.  J. B. DYM  2,063,990
AIR PURIFYING CANISTER
Filed Dec. 19, 1935
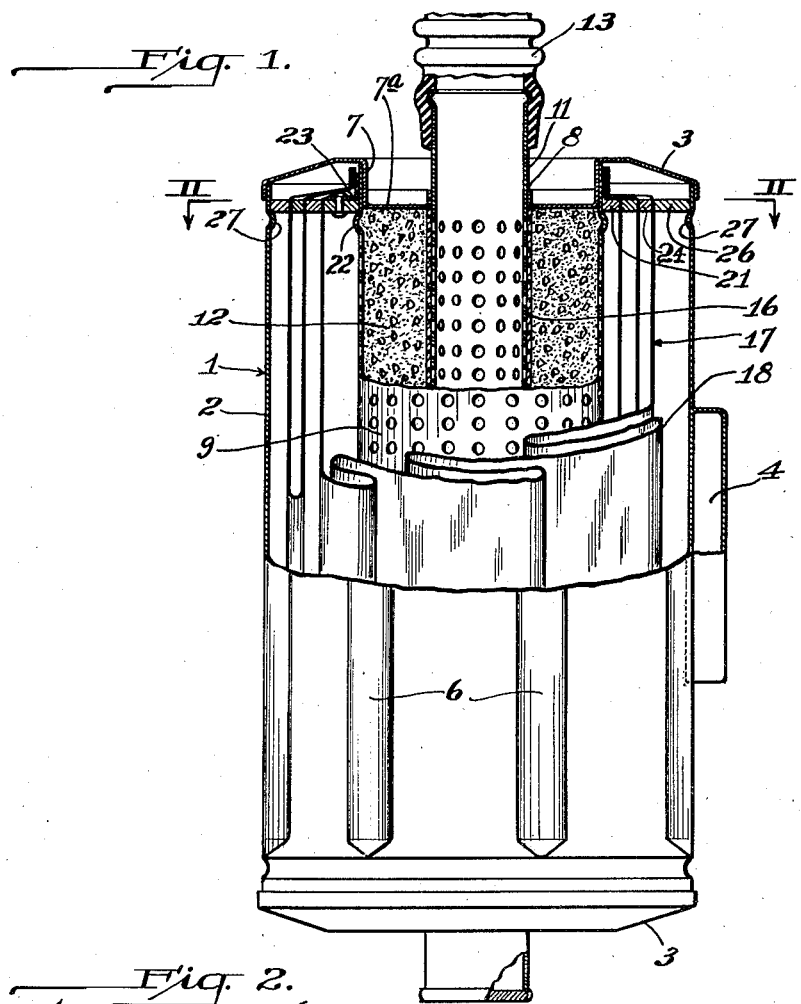
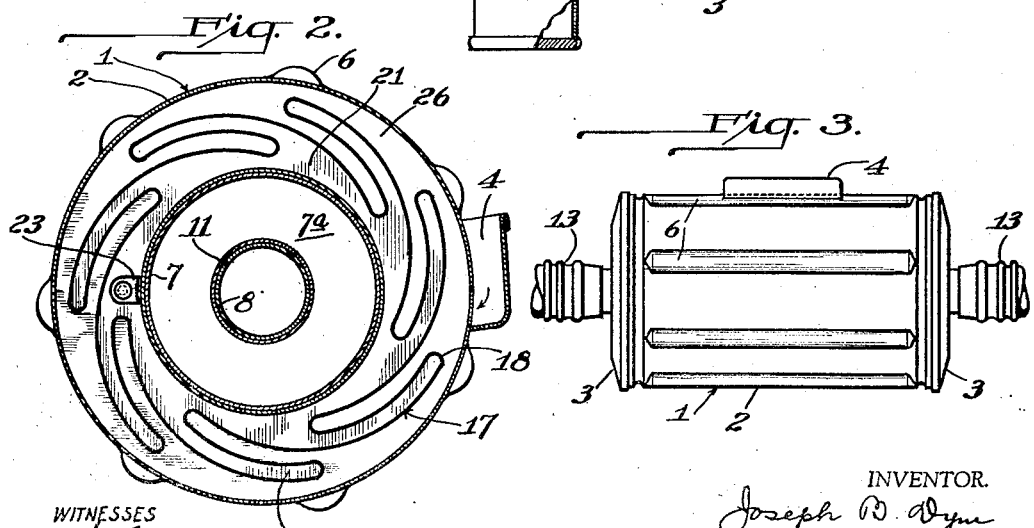
INVENTOR.
Joseph B. Dym
BY Brown, Critchlow & Flick
his ATTORNEYS
WITNESSES
O. B. Wallace
V. A. Peckham Patented Dec. 15, 1936

2,063,990

UNITED STATES PATENT OFFICE 2,063,990

AIR-PURIFYING CANISTER

Joseph B. Dym, Pittsburgh, Pa., assignor to Mine Safety Appliances Company, Pittsburgh, Pa., a corporation of Pennsylvania Application December 19, 1935, Serial No. 55,220

6 Claims. (Cl. 183—44)

This invention relates to the purifying of air to render it fit for breathing, and more particularly to filtering canisters used in respirators and breathing apparatus for that purpose.

A serious problem commonly encountered in the use of respirators is the high resistance to breathing which is offered, either initially or after use, by the air-purifying and filtering canisters or the like through which air is drawn to breathing apparatus worn by the individuals. That is, the filtering and purifying elements through which air must be drawn by a wearer may offer so much resistance to the passage of the air as to cause labored breathing which reduces physical efficiency.

It is among the objects of this invention to provide an air-purifying canister, for use with breathing apparatus, which possesses an initially low breathing resistance; which does not acquire a substantial increase in breathing resistance with use; which is relatively small and compact, light in weight, and inexpensive to make; and which includes air-filtering means of simple construction and low breathing resistance.

The invention is illustrated in the accompanying drawing in which Fig. 1 is a side view, partly in section, of an air-purifying canister constructed in accordance with the preferred embodiment of the invention; Fig. 2 is a horizontal section taken on the line II—II of Fig. 1; and Fig. 3 is a side view of the canister showing its use with breathing apparatus having two inlet tubes to the face-piece.

The invention is particularly applicable to canisters of the general type disclosed in United States Patent No. 1,501,286 granted to Frank J. Logan on July 15, 1924, and will therefore be described, by way of exemplification, with reference to canisters of that type. Such canisters, generally considered, comprise a foraminous body member spaced from and surrounding an inner foraminous member, usually in the form of a perforated tube one end of which provides an outlet for purified air. Surrounding the body and so associated with it that all of the air passing through the body into the canister must pass through it is an air-filtering element. A casing may be disposed about the body member and filtering element, to protect them, the casing having an inlet for impure air. The space between the body and inner members may be, and usually is, filled with material adapted to remove toxic or harmful gases from the air passed through the canister.

In the aforesaid patent the filtering element disclosed is a layer of felt encasing the body member. The present invention is concerned with improvements in the filtering element of such canisters.

In accordance with this invention particulate matter, such as toxic dusts and other harmful solids and vapors, is removed from air to render it fit for breathing, by providing an air-purifying canister having an inlet for impure air and an outlet for purified air with a filter element having an effective area materially in excess of prior practice whereby to allow sufficient air to pass through it for substantially unrestricted breathing, and so positioned and arranged in the canister construction that all of the air passed through the canister will pass through the filter element. In other words, the area of the filter element provided by this invention is so great that sufficient air can be drawn therethrough for breathing purposes without meeting the material resistance encountered heretofore when filter elements of substantially less area have been used. Likewise, the area of the filter element is so great that breathing resistance remains adequately low even though the pores in the element become partly clogged by particulate matter filtered out of the air passed through the filter.

Referring now to Figs. 1 and 2 of the drawing, a casing 1, preferably of generally cylindrical form, is formed from a shell 2 closed at its ends by tightly fitting caps 3 and provided in its side wall with an inlet port 4 of any suitable form. If desired, the casing shell may be provided with corrugations 6 extending longitudinally thereof for strengthening it. The central portion of each end cap is downstruck to form an annular shoulder 7 and an inwardly projecting flange 7a provided with a central opening 8.

Telescoping over annular shoulders 7 of the caps and supported thereby is a tubular receptacle 9 of foraminous material such as perforated metal, woven sheet, e. g., wire screen and the like. Disposed tightly in openings 8 in the end caps and projecting through the center of the foraminous receptacle is a perforated tube 11 the unperforated end portions of which project beyond the casing. Disposed in the space between receptacle 9, and perforated tube 11 is a charge of air-purifying material 12 of any suitable type for removing toxic or harmful gases from air passed therethrough. A variety of such materials are known at present in this art. One end of perforated tube 11 is connected to a flexible hose 13 the other end of which is connected to breathing apparatus (not shown), for example to the face-piece of a gas mask, for supplying purified air thereto. In this case the opposite or lower end of tube 11 is sealed so that when the wearer inhales he will draw air through inlet 4, air-purifying material 12, tube 8 and hose 13. When breathing apparatus is used which has two hoses for supplying purified air to the face-piece, both ends of the perforated tube are left open to serve as outlets and one hose is connected to each as shown in Fig. 3. To prevent the air-purifying material from being drawn into tube 11 through its perforations, a cloth 16 is wrapped around the tube; this cloth should be of such mesh as to accomplish its stated purpose without offering any material resistance to breathing.

Surrounding receptacle 9 in the space between it and the side wall of the casing is an element 17 adapted to filter particulate matter, such as harmful or toxic dusts and the like out of the air being drawn through the canister by the wearer of the breathing apparatus. Heretofore, it has been the general practice to merely wrap one or more layers of felt or other fibrous material around the receptacle containing the air-purifying material and in engagement therewith. Felt, however, commonly offers relatively high resistance to breathing, especially when several layers are used, and clogging of its pores by particles filtered out of the air may unduly increase its already high breathing resistance.

It is a feature of this invention that the effective area of the filter element, which is in the form of a sheet of fibrous material, is materially in excess of prior practice, without the canister being enlarged, whereby to provide a very large filtering area and to allow sufficient air to pass through the sheet for substantially unrestricted breathing even though some of its pores become clogged in use. Accordingly, the filter sheet is provided with a plurality of spaced reverse folds 18 that occupy the restricted space between the receptacle and the casing. In this way the surface area of the filter is greatly increased without enlarging the canister. Preferably, the folds in the sheet are relatively long and are disposed in spaced overlapping relation as best shown in Fig. 2.

To hold the sheet in its folded configuration, a plate 21 of any suitable comparatively rigid material is mounted on each end of the cylindrical receptacle where it is prevented from moving inwardly by detents 22 struck out of the receptacle. If desired, the plate can be further held in place by small angles 23 attached thereto and to the receptacle. The plate is provided with peripheral fingers 24 of the same shape and number as the folds in the filter sheet, the fingers projecting into folds 18 which are supported thereby. To further maintain the sheet in its folded shape, a plate 26 complementary to that just described is preferably disposed in each end of the casing where it registers with plate 21 and clamps the folds of the filter sheet between their interengaging fingers. These clamping plates 26 are prevented from moving inwardly by detents 27 in the wall of the casing. The end portions of the filter sheet projecting outwardly beyond its retaining plates are gathered around the annular shoulders of the end caps to which they may be attached by any suitable means, such as an adhesive.

It should be noted that plates 21 space the filter from receptacle 9. With this arrangement the filter is allowed to give when exposed to the impact of particulate matter during inhalation, whereby the impact is absorbed by the filter, which results in more efficient stopping of the particulate matter from penetrating the filter. Consequently, the pores in the filter do not have to be as small as would be necessary if the filter were rigidly supported, and breathing resistance is correspondingly lowered.

While various sheet-like filtering elements may be used, it is preferred to use a porous cellulosic material in sheet form and of such porosity as to satisfactorily remove particles of dust of the size encountered in use. That is, for coarse dusts there may be used a cellulosic material sheet whose pores are coarser than those of a paper used in a respirator for fine particles, such as those of smokes. Most suitably the filter element is formed from cellulose fiber sheet treated to provide pore openings of critical size. Such critical pore size is obtainable by impregnating the pores of foraminous material, suitably cellulosic sheets, with finely divided substances which clog the larger pores to provide a filter the pores of which will prevent passage of particles to be filtered out, i. e., to provide critical pore size.

The finely divided substance used will depend, of course, largely on the desired critical pore size and the pores in the original cellulosic material. For many purposes, however, satisfactory results are had by impregnating the filter with finely divided carbon. This is accomplished suitably by cracking gases such as methane, ethane, ethylene and acetylene, or vaporized liquids such as kerosene and gasoline. Thus, such gases and vapors are ignited from a suitable burner and the supply of air then reduced so that the gas or vapor burns in part and is cracked in part to produce finely divided carbon. The smoke thus produced is then passed through the foraminous material to impregnate its pores in the manner just described. Other smokes may also be used, such as those produced by evaporation, dilution and condensation, or by reaction of two gases, such as hydrogen chloride and ammonia, or by dilution of zinc vapor accompanied by its oxidation. Also, two layers of treated material treated to restrict the larger pores may be superimposed to provide critical pore size.

This is described and claimed, for example, in United States Patents No. 1,798,164 to Harry A. Kuhn and William A. Boyle, No. 1,814,190 to R. L. Sebastian and L. Finkelstein and No. 1,818,155 to N. E. Oglesby and R. S. Brown. These filter materials have the advantage that they can be adapted to the removal of even the finest dusts, it being possible by the treatments described in the aforesaid patents to render the pore openings less than 1 micron in size, while at the same time providing filters that are efficient and of not unduly high breathing resistance.

An air-purifying canister constructed in accordance with this invention is relatively small and compact, but offers low breathing resistance. Consequently, the individual using the canister is capable of greater or more prolonged physical effort because his energy is not reduced by labored breathing. Even though the pores of the filter become clogged to some extent in use, the area of the filter is great enough to permit substantially effortless breathing to be continued.

The particular shape of filter shown in which there are long overlapping folds is especially desirable because it permits large surface area to be obtained without materially increasing the over-all diameter of the filter, whereby a comparatively small canister can be used. Likewise, the overlapping folds of the filter tend to cause reverse flow of air as it passes around the filter, which aids the filtering process. If desired, the folds of the filter can be supported by forming receptacle 9 with overlapping folds or wings to take the place of plates 21.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In a respirator comprising a body member through which purified air is passed, the combination with said member of a sheet of filter material surrounding said member in the path of all of the air passing through said member, said sheet being provided with a plurality of spaced overlapping folds with the two layers of each fold spaced apart, whereby to provide a surface area great enough to allow sufficient air to pass through said sheet for substantially unrestricted breathing.

2. An air-purifying canister for use in respirators, comprising a casing provided with an inlet port for impure air, a perforated receptacle mounted in said casing and spaced from the side wall thereof, said receptacle being provided with an outlet port adapted to be connected to breathing apparatus, a charge of air-purifying material disposed in said receptacle, a sheet of filter material surrounding said receptacle in the space between it and said casing, said sheet being provided with a plurality of spaced overlapping folds to provide a surface area great enough to allow sufficient air to pass through said sheet for substantially unrestricted breathing, the two layers of each of said folds being spaced apart, and a plate mounted in each end of said casing and provided with a plurality of peripheral fingers disposed in spaced overlapping relation for supporting said folds of the sheet.

3. In a respirator comprising a body member through which purified air is passed, the combination with said member of a sheet of filter material surrounding said member in the path of all of the air passing through said member, said sheet being provided with a plurality of spaced overlapping folds of substantially uniform width throughout their length with the two layers of each fold spaced apart.

4. In a respirator comprising a body member through which purified air is passed, the combination with said member of a sheet of filter material surrounding said member in the path of all of the air passing through said member, said sheet being provided with a plurality of spaced overlapping folds with the two layers of each fold spaced apart, whereby to provide a surface area great enough to allow sufficient air to pass through said sheet for substantially unrestricted breathing, and means for supporting said sheet at its edges with the body portion of the sheet free.

5. An air-purifying canister for use in respirators, comprising a casing provided with an inlet port for impure air and with an outlet port in an end wall for purified air, a sheet of filter material in said casing surrounding said outlet port and spaced from said casing side wall, said sheet being formed with spaced overlapping folds, the two layers of each fold being spaced apart, and a plate mounted in each end of said casing and provided with a plurality of peripheral fingers disposed in spaced overlapping relation and extending into said folds for maintaining them in the sheet.

6. An air-purifying canister for use in respirators, comprising a casing provided with an inlet port for impure air and with an outlet port in an end wall for purified air, a sheet of filter material in said casing surrounding said outlet port and spaced from said casing side wall, said sheet being formed with spaced overlapping folds, the two layers of each fold being spaced apart, a plate mounted in each end of said casing and provided with a plurality of peripheral fingers disposed in spaced overlapping relation and extending into said folds in the sheet, and a ring plate mounted in each end of the casing and provided with inwardly extending spaced overlapping fingers complementary to said plate fingers for clamping said sheet folds against said plate fingers.

JOSEPH B. DYM.